US009535961B2

(12) United States Patent
Dash et al.

(10) Patent No.: US 9,535,961 B2
(45) Date of Patent: Jan. 3, 2017

(54) QUERY SUMMARY GENERATION USING ROW-COLUMN DATA STORAGE

(75) Inventors: Debabrata Dash, Vaud (CH); Wenting Tang, Sunnyvale, CA (US); Marylou Orayani, San Jose, CA (US); Bradley W. Cleveland, Los Altos, CA (US); Masaki Utsumiya, San Jose, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 277 days.

(21) Appl. No.: 14/358,500

(22) PCT Filed: Nov. 18, 2011

(86) PCT No.: PCT/US2011/061355
§ 371 (c)(1),
(2), (4) Date: May 15, 2014

(87) PCT Pub. No.: WO2013/074115
PCT Pub. Date: May 23, 2013

(65) Prior Publication Data
US 2014/0330816 A1 Nov. 6, 2014

(51) Int. Cl.
*G06F 17/30* (2006.01)
(52) U.S. Cl.
CPC ... *G06F 17/30554* (2013.01); *G06F 17/30315* (2013.01); *G06F 17/30477* (2013.01); *G06F 17/30536* (2013.01)
(58) Field of Classification Search
CPC ............ G06F 17/30554; G06F 17/30315; G06F 17/30477; G06F 17/30536
See application file for complete search history.

(56) References Cited

U.S. PATENT DOCUMENTS

| 6,385,604 | B1* | 5/2002 | Bakalash .......... C03B 37/02718 |
| 6,556,990 | B1 | 4/2003 | Lane |
| 7,822,765 | B2 | 10/2010 | Back et al. |
| 9,043,228 | B1* | 5/2015 | Ross, Jr. ............ G06Q 30/0274 705/14.19 |
| 2002/0029207 | A1* | 3/2002 | Bakalash .......... G06F 17/30457 |
| 2002/0143751 | A1 | 10/2002 | Chow et al. |
| 2006/0053128 | A1 | 3/2006 | Gestrelius et al. |

(Continued)

FOREIGN PATENT DOCUMENTS

| CN | 102239472 | 11/2011 |
| IN | 00493CH2007 | 3/2007 |
| WO | WO-2008122830 A1 | 10/2008 |

OTHER PUBLICATIONS

Supplementary European Search Report, Jun. 24, 2014, European Patent Application No. 11875745.9, 7 pages.

(Continued)

*Primary Examiner* — Huawen A Peng
(74) *Attorney, Agent, or Firm* — Mannava & Kang, P.C.

(57) ABSTRACT

A data storage system includes a column store and a row store. The data storage system may generate a query summary. The data storage system determines query summary fields comprised of a subset of fields from a schema used to store data in the row store. The data storage system searches the column store or the row store for query results in the query summary fields. A query summary field is generated from the query results in the query summary fields.

14 Claims, 9 Drawing Sheets

(56) References Cited

U.S. PATENT DOCUMENTS

| | | |
|---|---|---|
| 2008/0018663 A1 | 1/2008 | Sun |
| 2009/0119262 A1 | 5/2009 | Guo et al. |
| 2010/0011031 A1 | 1/2010 | Huang et al. |
| 2010/0036789 A1 | 2/2010 | Marleau |
| 2011/0078133 A1 | 3/2011 | Bordawekar et al. |
| 2011/0137636 A1 | 6/2011 | Srihari et al. |

OTHER PUBLICATIONS

International Searching Authority, Appl. No. PCT/US2011/061355, filed Nov. 18, 2011, Search Report and Written Opinion, 8pp, May 7, 2012.

* cited by examiner

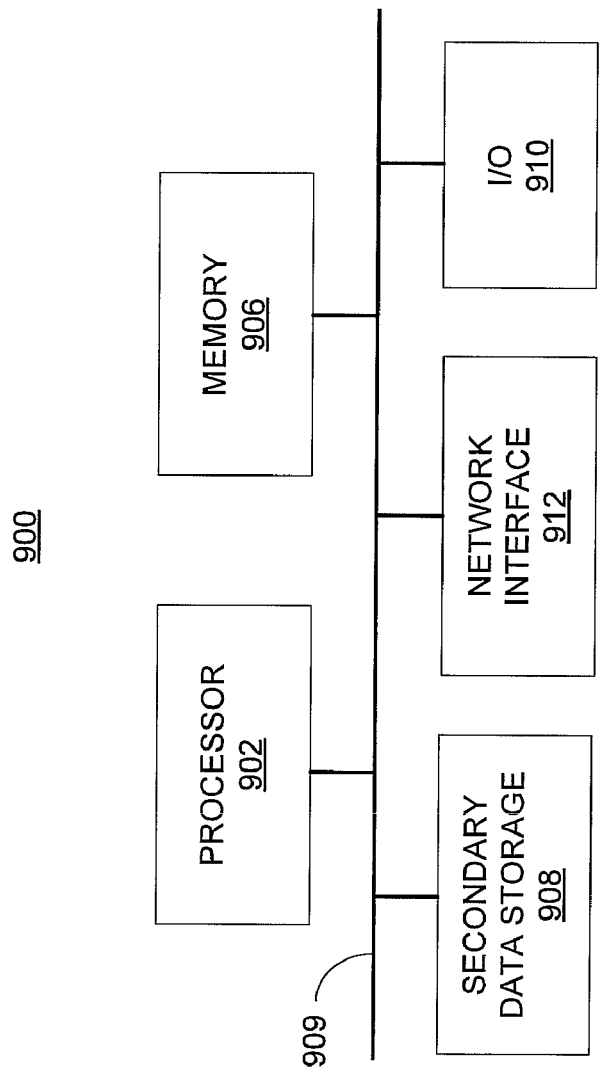

QUERY SUMMARY GENERATION USING ROW-COLUMN DATA STORAGE

BACKGROUND

It's challenging to run queries in a traditional relational database management system (RDBMS) if the RDBMS is used to store large amounts of data, which may include millions or even billions of entries. Environments generating this amount of data are not uncommon, such as an event management system continuously receiving events from many different sources.

Indexes may be created to improve query performance. However, indexing on large amounts of data for every column in the database can reduce query performance as queries may have to wait for indexing to complete. Also, indexing increases the amount of storage needed for the database due to the size of the indices for environments requiring storage of large amounts of data. Also, write operations take longer because the tables need to be re-indexed.

In addition, with such large amounts of data, reviewing query results can become unmanageable. A query may generate thousands or even millions of hits. It is often difficult for the user to parse such a large number of hits. In a typical situation, a first hundred hits are presented to the user. The user reviews the hits through a graphical user interface (GUI) and then clicks on a button to retrieve the next hundred hits and so on, which is a time consuming and inefficient process.

BRIEF DESCRIPTION OF DRAWINGS

The embodiments are described in detail in the following description with reference to the following figures.

FIG. 9 illustrates a computer system that may be used for the methods and systems, according to an embodiment.

DETAILED DESCRIPTION OF EMBODIMENTS

Figure 1:
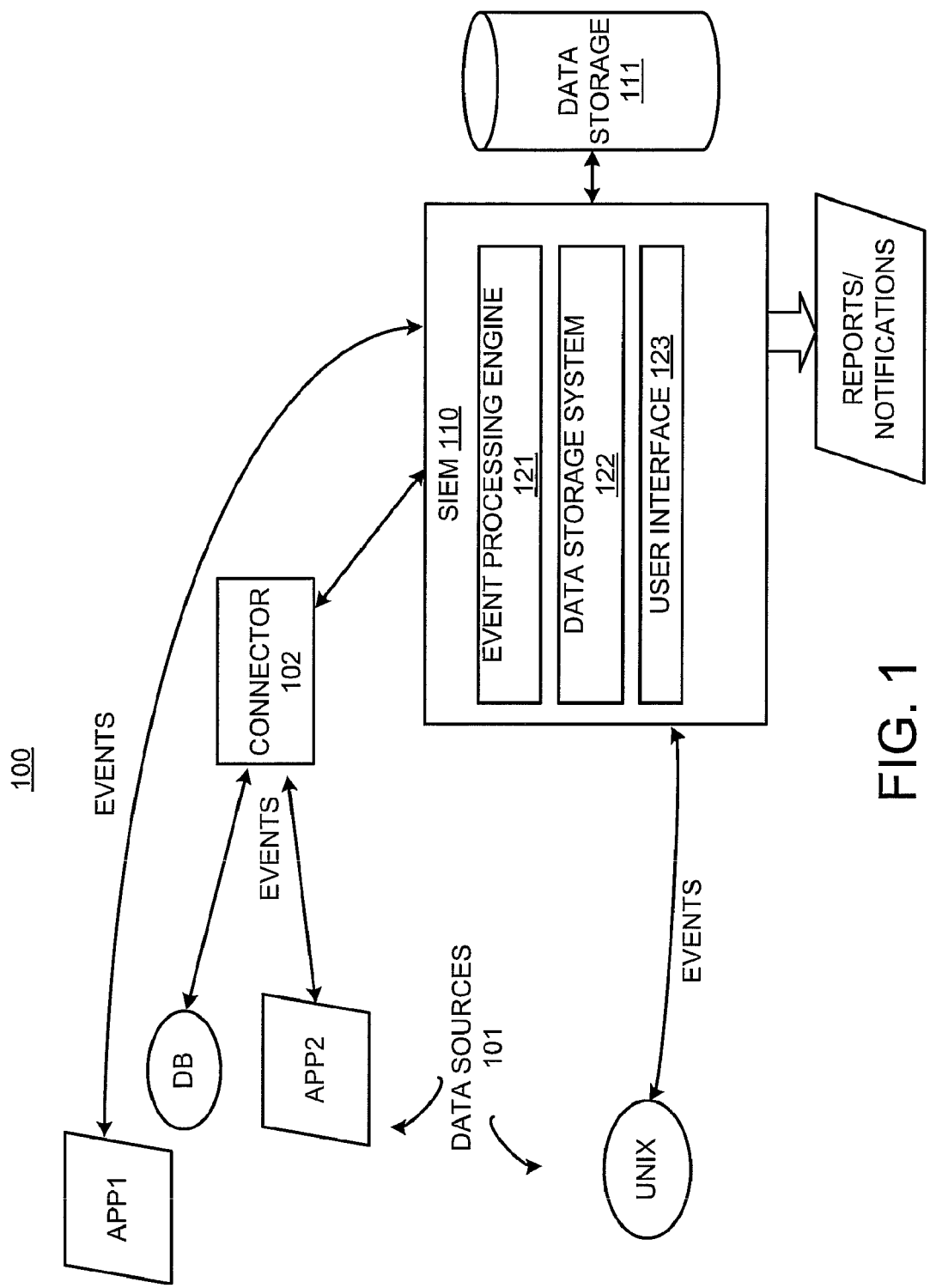
FIG. 1 illustrates an information and event management system, according to an embodiment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a hybrid data storage system stores data in both column and row data storage. The system selects the column or row data storage to execute a query depending on various parameters, which may improve the speed of running a query. The data storage system is operable to optimize queries to be executed on large volumes of data stored in the data storage system using the column and row data storage. For example, in addition to determining the hits for a query, the data storage system generates a query summary of the hits. The hits are the search results from running the query. The query summary includes a subset of the fields storing the data in the data storage system. The subset of fields are referred to as the query summary fields. The query summary may include a histogram for each field in the subset. The histogram may include an aggregated count for each query summary field. The query summary allows a user to quickly identify the most relevant data of the query results. Also, the data storage system allows drill-downs on information in the query summary.

The data storage system also performs optimization which may allow the query summary to be stored in memory. For example, the query summary may be too large to store in memory, so the data storage system performs optimizations to reduce the amount of data in the query summary but retain the data that may be most relevant to the user. By optimizing the query summary for storage in memory, drill-downs may be performed faster. The optimization techniques described herein provide a way to scale query summaries and drill downs for large amounts of data.

The data storage system also generates global summaries. A global summary is generated for all the data received within a predetermined time period. The global summary may include all or most of the fields in a storage schema as opposed to a smaller number of fields from the schema that may be used for the query summary fields. By way of example and not limitation, a global summary may be generated for every 5-minute episode of data. As new data is stored, old data may be removed either for regulatory compliance reasons, or to create space for the new data. The global summaries provide a scalable approach to maintaining information for the deleted data. Also, the episodic global summaries can be used to optimize a query executed for a large time range. For example, the global summaries can be used to quickly determine a narrow time range that has hits for the query rather than searching the entire time range.

An example of the type of data stored in the data storage system is event data. An event is an instance of data collected and stored at the data storage system. The event may be associated with or describe an activity or action that was performed. In general, an event is generated once and does not change afterwards. The event data includes one or more events. The event data may be comprised of log data, which can be generated by various sources (including devices and applications), and can be in any format. An event can be, for example, an entry in a log file, an entry in a syslog server, an alert, an alarm, a network packet, an email, a notification, etc.

The event data may be correlated and analyzed to identify network security threats. A security event is a type of event and is any activity that can be analyzed to determine if it is associated with a security threat. The activity may be associated with a user, also referred to as an actor, to identify the security threat and the cause of the security threat. Activities may include logins, logouts, sending data over a network, sending emails, accessing applications, reading or writing data, etc. A security threat includes activity determined to be indicative of suspicious or inappropriate behavior, which may be performed over a network or on systems connected to a network. Common security threats, by way of example, are user attempts to gain unauthorized access to confidential information, such as social security numbers, credit card numbers, etc., over a network.

The data sources for the events may include network devices, applications or other types of data sources described below operable to provide event data that may be used to identify network security threats. Event data is data describing events. Event data may be captured in logs or messages generated by the data sources. For example, intrusion detection systems (IDSs), intrusion prevention systems (IPSs), vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data can include information about the device or application that generated the event. The event source is a network endpoint identifier (e.g., an IP address or Media Access Control (MAC) address) and/or a description of the source, possibly including information about the product's vendor and version. The time attributes, source information and other information is used to correlate events with a user and analyze events for security threats.

FIG. 1 illustrates an environment 100 including security information and event management system (SIEM) 110, according to an embodiment. The SIEM 110 processes event data, which may include real-time event processing. The SIEM 110 may process the event data to determine network-related conditions, such as network security threats. Also, the SIEM 110 is described as a security information and event management system by way of example. As indicated above, the system 110 is an information and event management system, and it may perform event data processing related to network security as an example. It is operable to perform event data processing for events not related to network security. The environment 100 includes data sources 101 generating event data for events, which are collected by the SIEM 110 and stored in the data storage 111. The data storage 111 may include a database or other type of data storage system. The data storage 111 may include memory for performing in-memory processing and/or non-volatile storage for database storage and operations. The data storage 111 stores any data used by the SIEM 110 to correlate and analyze event data.

The data sources 101 may include network devices, applications or other types of data sources operable to provide event data that may be analyzed. Event data may be captured in logs or messages generated by the data sources 101. For example, intrusion detection systems (IDSs), intrusion prevention systems (IPSs), vulnerability assessment tools, firewalls, anti-virus tools, anti-spam tools, encryption tools, and business applications may generate logs describing activities performed by the data source. Event data is retrieved from the logs and stored in the data storage 111. Event data may be provided, for example, by entries in a log file or a syslog server, alerts, alarms, network packets, emails, or notification pages. The data sources 101 may send messages to the STEM 110 including event data.

Event data can include information about the source that generated the event and information describing the event. For example, the event data may identify the event as a user login or a credit card transaction. Other information in the event data may include when the event was received from the event source ("receipt time"). The receipt time may be a date/time stamp. The event data may describe the source, such as an event source is a network endpoint identifier (e.g., an IP address or Media Access Control (MAC) address) and/or a description of the source, possibly including information about the product's vendor and version. The data/time stamp, source information and other information may then be used for correlation performed by the event processing engine 121. The event data may include meta data for the event, such as when it took place, where it took place, the user involved, etc.

Examples of the data sources 101 are shown in FIG. 1 as Database (DB), UNIX, App1 and App2. DB and UNIX are systems that include network devices, such as servers, and generate event data. App1 and App2 are applications that generate event data. App1 and App2 may be business applications, such as financial applications for credit card and stock transactions, IT applications, human resource applications, or any other type of applications.

Other examples of data sources 101 may include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices includes routers and switches. Examples of encryption devices include data security and integrity. Examples of physical security systems include card-key readers, biometrics, burglar alarms, and fire alarms. Other data sources may include data sources that are unrelated to network security.

The connector 102 may include code comprised of machine readable instructions that provide event data from a data source to the SIEM 110. The connector 102 may provide efficient, real-time (or near real-time) local event data capture and filtering from one or more of the data sources 101. The connector 102, for example, collects event data from event logs or messages. The collection of event data is shown as "EVENTS" describing event data from the data sources 101 that is sent to the SIEM 110. Connectors may not be used for all the data sources 101. The event process extender 123 may provide an interface for retrieving data from the data sources.

The SIEM 110 collects and analyzes the event data. Events can be cross-correlated with rules to create meta-events. Correlation includes, for example, discovering the relationships between events, inferring the significance of those relationships (e.g., by generating metaevents), prioritizing the events and meta-events, and providing a framework for taking action. The system (one embodiment of which is manifest as machine readable instructions executed by computer hardware such as a processor) enables aggregation, correlation, detection, and investigative tracking of activities. The system also supports response management, ad-hoc query resolution, reporting and replay for forensic analysis, and graphical visualization of network threats and activity.

The SIEM 110 may include modules that perform the functions described herein. Modules may include hardware and/or machine readable instructions. For example, the modules may include event processing engine 121, data storage system 122 and user interface 123. The event processing engine 121 processes events according to rules and instructions, which may be stored in the data storage 111. The event processing engine 121, for example, correlates events in accordance with rules, instructions and/or requests. For example, a rule indicates that multiple failed logins from the same user on different machines performed simultaneously or within a short period of time is to generate an alert to a system administrator. Another rule may indicate that two credit card transactions from the same user within the same hour, but from different countries or cities, is an indication of potential fraud. The event processing engine 121 may provide the time, location, and user correlations between multiple events when applying the rules.

The user interface 123 may be used for communicating or displaying reports or notifications about events and event processing to users. The user interface 123 may be used to receive queries and provide query results to users. The user interface 123 may include a GUI that is be web-based.

Figure 2:
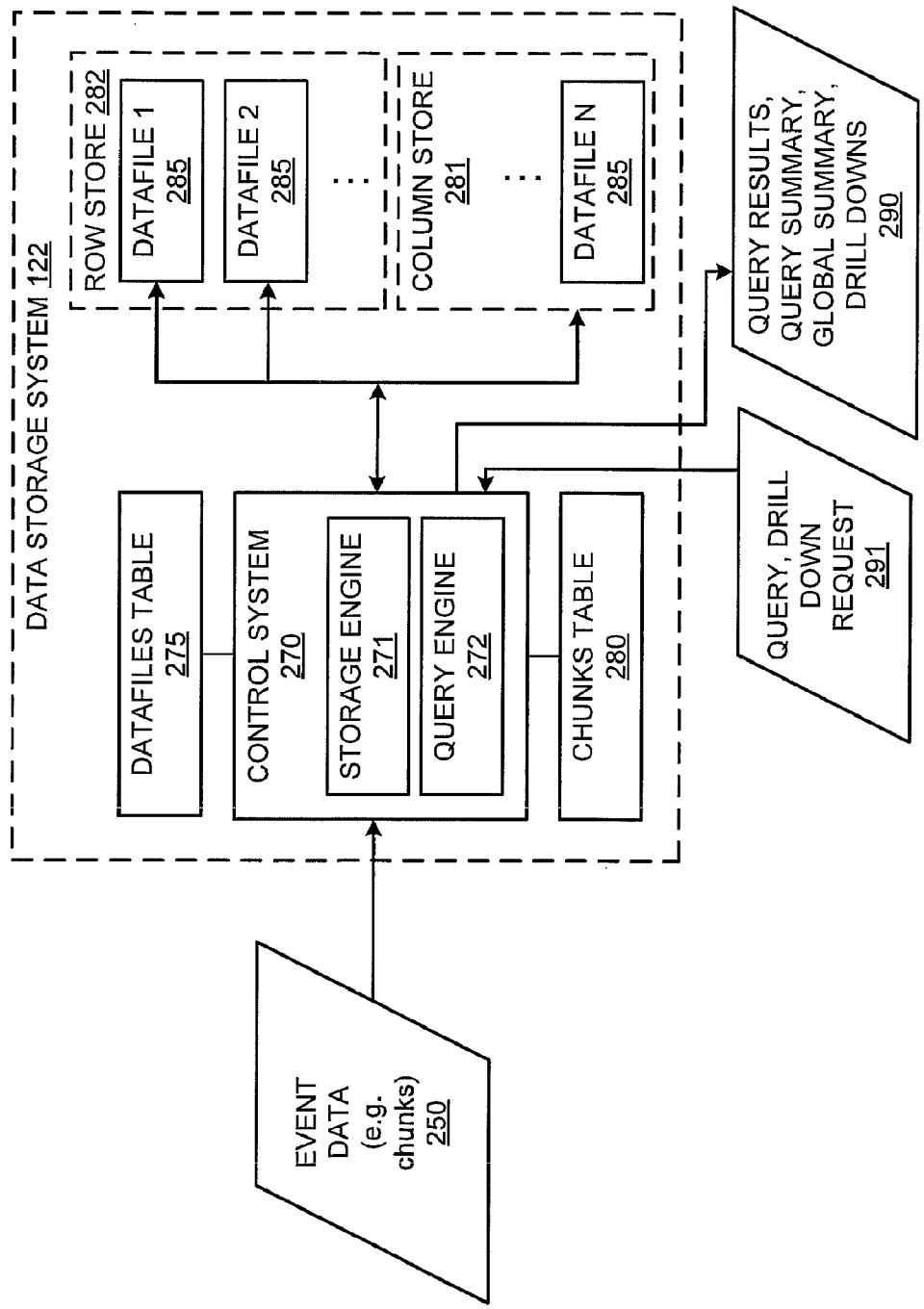
FIG. 2 illustrates a data storage system, according to an embodiment.

The data storage system 122 is a hybrid column-row storage system as described in further detail with respect to FIG. 2. The data storage system 122 stores events, which may include security events (sometimes referred to as "log data") received from the data sources 101. The events may be stored in compressed form. However, the data storage system 122 can retrieve these events on demand and restore them to their original, unmodified form for forensics-quality data.

The data storage system 122 may be optimized for extremely high event throughput. The data storage system 122 can store events which may be received at a high rate and in large volumes. For example, events containing 300-500 fields may be received at a rate of 10-30 thousand per second. The data storage system 122 stores the events in hybrid column-row storage system, which comprises terabytes of data. The data storage system 122 may run queries on the events. The data storage system 122 can optimize the queries and improve execution time of the queries through query summaries and optimization techniques described below.

The data storage 111 may include a database or other type of data storage system that can be included in the data storage system 122. For example, datafiles, datafiles tables, and database tables which may be stored in the data storage 111 can be part of the data storage system 122 or managed by the data storage system 122.

FIG. 2 illustrates the data storage system 122. The data storage system 122 may be provided in the SIEM 100 or external to the SIEM 100. Also, the data storage system 122 may be used in or with systems other than the SIEM 100.

The data storage system 122 receives event data, which may comprise data chunks as further described below, and stores the event data so it can be queried. The data storage system 122 includes a control system 270, a datafiles table 275, a chunks table 280, and datafiles 285. The control system 270 is communicatively coupled to the datafiles table 275, the chunks table 280, and the datafiles 285. The control system 270 controls operation for storing events and running queries. For example, the control system 270 includes a storage engine 271 storing event data, including managing and storing chunks, and a query engine 272 running queries, generating query summaries and global summaries, performing query optimizations, and performing drill downs. FIG. 2 shows the control system 270 receiving event data (e.g., chunks) 250. The event data 250 may include the events from FIG. 1. The storage engine 271 stores the event data 250 in the row store 282 and column store 281 as described below. FIG. 2 also shows the control system 270 receiving queries and drill down requests 291. The storage engine 271 may generate search results for the queries and drill downs, query summaries and global summaries, shown as 290.

The event data may include time attributes comprised of Manager Receipt Time (MRT) and Event Occurrence Time (ET). MRT is when the event is received by the data storage system 122 and ET is when the event happened. ERT and MRT are fields in the event schema. ERT or MRT may be used in queries to limit the search results to a desired time frame. Episodes for global summaries may be based on ERT or MRT as well. Also ET or MRT may be used to identify chunks which satisfy a query.

The datafiles table 275 stores information about the datafiles 285. In one embodiment, each entry in the datafiles table 275 represents one datafile of the datafiles 285 for which space has been allocated, and the entry includes a unique identifier associated with the datafile and the location of the datafile (e.g., a file system, a path therein, and a file name).

The event data may be stored in chunks. For example, event data is partitioned into chunks and the data in the chunks is stored in the data storage system 122. For example, events are parsed into their field values and the field values and receipt times may be stored in buffers. At some point in time, a chunk is generated from contents in the buffer. Different chunks can have different sizes. Chunk sizes can differ due to, for example, the type of field values stored in a chunk and the type of trigger that caused the chunk to be generated. In one embodiment, a maximum chunk size can be specified. Each chunk may include metadata including a chunk identifier (ChunkID), a stripe identifier (StripeID), and a set of index location identifiers (IndexLocationIDs). The ChunkID uniquely identifies the chunk with respect to other chunks. The StripeID, which is shared among a set of chunks, is used to associate the chunks with each other (since a set of chunks may concern the same set of events). The set of IndexLocationIDs includes one IndexLocationID for each field value in the chunk. The IndexLocationID is used to access a field value in a different chunk that corresponds to the same event. The IndexLocationID may include the StripeID and an offset identifier (OffsetID). The OffsetID indicates which field value within a chunk corresponds to the desired event. Chunks may be compressed. The event data may be partitioned into chunks before it is received at the data storage system.

The chunks table 280 stores information about the one or more chunks 250 that are received and stored in the datafiles 285. This information may include, for each chunk 250, the metadata for the chunk, which may include time attributes and other information about data in the chunk and the location of the chunk (e.g., the unique identifier associated with the datafile that stores the chunk and the location within the datafile where the chunk is stored (e.g., as an offset)).

Each of the datafiles 285 stores event data, which may include multiple chunks. The data files 285 may be the same size or different sizes and may be organized in time order. The datafiles 285 may be stored in a file system on hard disks.

The data storage system 122 may store data in row-based storage and column-based storage. The row-based storage is shown as row store 282 and the column-based storage is shown as column store 281. If different events include the same fields, then the events can be organized in a table. Each row of the table represents a different event, and each column of the table represents a different field.

In row-based storage, data storage is record- (row-) oriented. The attributes (field values) of a record are placed contiguously in storage. In this architecture, a single disk write suffices to push all of the fields of a single record out to disk. Hence, high performance writes are achieved, and a database management system (DBMS) with a row store architecture is called a write-optimized system (WOS).

In column-based storage, data storage is field- (column-) oriented. The values stored in one column, across multiple records, are placed contiguously in storage. In this architecture, a DBMS needs to read the values of only those columns that are required for processing a given query and can avoid loading into memory irrelevant field values (attributes). Hence, high performance ad-hoc querying is achieved, and a DBMS with a column store architecture is called a read-optimized system (ROS).

A chunk contains one or more events. Since an event can be thought of as a row of a table, a chunk can be thought of as containing one or more rows of a table. In other words, chunks may be considered to follow a row store architecture. For example, events are concatenated together, one event after the other, to be put into a (row-based) chunk. Although the chunks are row-based, chunks may be generated that are column-based. For example, a different way to build a chunk is to store each column of an event table as a different (column-based) chunk. Each column-based chunk represent a column in the event table (i.e., a set of values for the same field in multiple events). Rather than representing the table as one big row-based chunk containing all of the rows (events), the table represents multiple column-based chunks (one for each column of the table).

The control system 270 stores the same event data in both the row store 282 and the column store 281. Thus, each event may be stored twice. For example, chunks representing rows and chunks representing columns for the same events are stored in a row-based table and a column-based table respectively. The tables may be stored in the datafiles 285.

The generation and storage of row-based chunks and the generation and storage of column-based chunks may not be performed as part of the same transaction. If events are being received at a very high rate, then the generation and storage of column-based chunks ("indexing") can lag behind the generation and storage of row-based chunks. No data is dropped or delayed to the cost (e.g., time cost) of indexing. Note that even if the indexing is lagging behind the generation and storage of row-based chunks, the user can still query all of the event data using the row-based chunks.

Also, row-based chunks and column-based chunks can be associated with different retention policies. For example, a row-based chunk that stores a set of events can be associated with a first retention policy, and the column-based chunks that store the same set of events can be associated with a second retention policy (or multiple retention policies, as described above). As long as the row-based chunk exists, then the column-based chunks can be recreated if necessary. Likewise, as long as the column-based chunks exist, then the row-based chunk can be recreated if necessary. In general, less space is required to store a set of events in multiple column-based chunks than in one row-based chunk. So, according to one example of a retention policy, column-based chunks are stored longer than row-based chunks (e.g., for the same set of events).

Also, all the columns may not be stored for the column-based storage of events. Consider a set of events that is stored using a row-based chunk. Instead of storing all of the columns of the events as column-based chunks, only selected columns may be stored in this way. Since column-based chunks are faster to query, in one example, the most frequently queried columns are stored as column-based chunks. Note that even though the remaining columns are not stored as column-based chunks, their field values can still be queried by using the row-based chunk, since the row-based chunk includes all of the event data.

In another example, one way to optimize queries on events stored as row-based chunks is to create column-based chunks for the event fields that are queried most frequently. Creation of these column-based chunks can occur at any point in the event storage process. The storage strategy, such as whether to store events as row and/or column-based architecture, retention policies, which fields to use for column-based storage may be selected by a user or another system and may be changed at any time.

The control system 270 may receive a query, for example, generated by a user, and the query engine 272 generates a query summary and may also generate the complete search results for the query. The query summary provides aggregate counts on the search results for the query summary fields. The counts include counts of field values in the complete search results for each of the query summary fields. The counts may be arranged by the query summary fields. As indicated above the query summary fields may comprise a subset of the fields that are less than the total number of fields used to store the data. For example, an event schema may comprise 300-500 fields describing the event data. The query summary, for example, may comprise 10-20 fields from the schema. The query engine 272 also provides drill-down capability that allows a user to drill down on the counts to refine the search and gather more information about the data.

In one example, the query summary comprises a histogram for the query summary fields (e.g., top ten field values). For example, for a source device field, the histogram includes top ten source devices that generated events that match the query. The query summary may also indicate the percentage of hits for each source device, e.g., source device A produced 50% of hits. To drill down, the user may click on the source device A in the histogram, and the query engine 272 provides the list of hits that were generated by the source device A.

Figure 3:
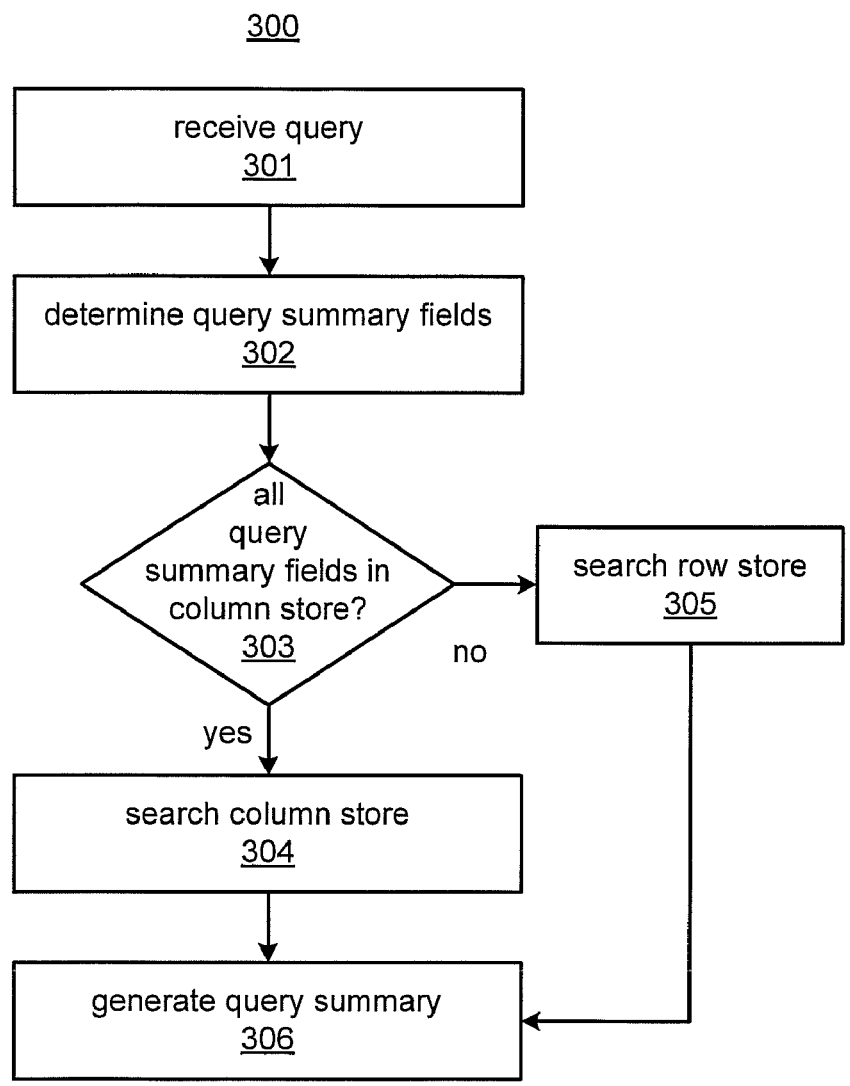
FIGS. 3-8 illustrate methods, according to embodiments.

FIG. 3 illustrates a method 300 for generating query summary using the hybrid data store of the data storage system 122. The steps of the method 300 and other methods described herein may be performed by the data storage system 122 and components of the data storage system 122 shown in FIG. 2. At 301, the query engine 272 receives a query. At 302, the query engine 272 determines the query summary fields. The query summary fields may be predetermined and retrieved from storage, or may be selected by a user or may be selected by a computerized process. At 303, the query engine 272 determines if all the query summary fields are stored in the column store 281. If yes, at 304, the query engine 272 searches the column store 281 to generate the query summary. The row store 282 may not be used at 304 if all the query summary fields are stored in the column store 281. If at least one query summary field is not stored in the column store 281, the query engine 272 searches the row store 282 to generate the query summary at 305. At 305, the column store 281 may not be used, and the search may only be performed on the row store 282. At 306, the query engine 271 generates the query summary from the search of the row store 282 or the column store 281 as determined at 303-305. For example, at 306, the query engine 272 runs the query on the selected storage and determines counts of the hits on the query summary fields to generate histograms for the query summary fields. For example, if a query summary field is source device. A count is generated for each source device in the complete query search results. To determine a count for each source device, the count is incremented for a particular source device each time an event in the query search results includes the particular source device. These counts may be provided in the query summary. Also, counts may be aggregated to save memory space as described in detail below.

The query summary may be generated and displayed on a GUI. The complete search results may also be displayed. Querying of the column store 281 may be faster if looking at a small set of columns but querying of the row store 282 may be faster if looking for a large number of columns. Also, the query summary may be stored in memory. As described in further detail below, the data storage system 122 may optimize the query summary so it fits in memory, which can allow for faster drill downs.

Figure 4:
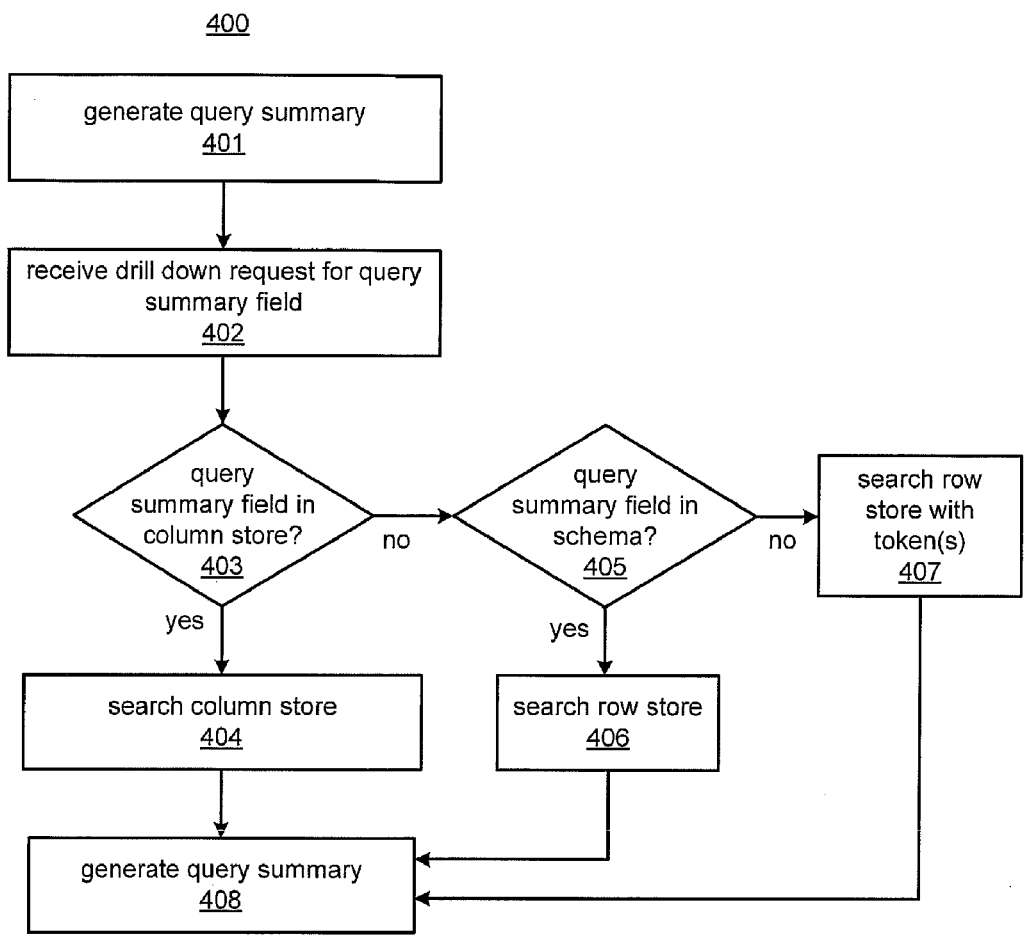

FIG. 4 illustrates a method 400 for optimizing a drill down. For example, at 401, the query engine 271 generates a query summary for a received query. The query summary may be generated as described above in the method 300. The query summary is displayed to a user. At 402, the control system 270 receives a drill down request which identifies a query summary field for the drill down. The drill down request may be generated by a user selecting a query summary field via a user interface. At 403, the control system 270 determines if the query summary field in the drill down request is in the column store 281. The datafiles table 275 stores data indicating the fields stored in the column store 281. The datafiles table 275 may store other information such as a list of the event fields in the event schema, a list of discovered fields, and a list of the query summary fields. The control system 270 may access the datafiles table to determine if the query summary field is in the column store 281.

At 404, if the query summary field in the drill down request is in the column store 281, the query engine 272 searches the column store 281 to retrieve the events matching the query for the query summary field. The retrieved events may be displayed to the user.

If the query summary field in the drill down request is not in the column store 281, then at 405, the control system 270 determines if the query summary field in the drill down request is a predetermined field in the event schema. For example, the event schema includes predetermined fields, which may be 300-500 fields. Event data that is determined not to match any of the fields in the event schema by the storage engine 271 may be stored in a discovered field. For example, the storage engine 271 receives data that indicates free memory (e.g., available memory capacity) for a source device when an event is generated. If there is no free memory field in the event schema, a discovered field may be created and called free memory. The discovered field may be stored in the row store 282.

If the query summary field in the drill down request is in the event schema, at 406, the query engine 272 searches the row store 282 to retrieve the events matching the query for the query summary field. The retrieved events may be displayed to the user.

If the query summary field in the drill down request is not in the event schema (e.g., is a discovered field), at 407, the query engine 272 searches the row store 282 using tokens associated with the discovered field to retrieve the events matching the query for the query summary field. The retrieved events may be displayed to the user. The search result from the tokens can be imprecise, as the token search cannot enforce location of the token. To make the search results more precise, regular expression matching may be applied to the events in the search results, and an appropriate event is selected. Note that regular expression can be directly applied without using the tokens, but using the tokens makes the drilldown faster.

The row store 282 may be indexed by tokens to improve search performance. In one example, tokens may include discovered field names, such as free memory. A token may be associated with a field value. For example, the query summary indicates that 50% of the time, free memory=1024 bytes. The user selects the free memory=1024 bytes for drill down. The row store 282 may be indexed on tokens for free memory and 1024 bytes. At 407, the query engine 272 searches the row store 282 using the tokens for free memory and 1024 bytes, which may identify all the source devices and events that match those criteria in the search results.

As indicated above, a query summary may be optimized to reduce its size so it may be stored in memory. Also, the number of unique entries in the fields may be too high to fit into the user interface. For example, a query summary field may be number of bytes sent. There may be thousands of different values for this field, so all the values or the top 10% of the values may be too large to fit on a user's display screen. According to embodiments, field cardinality is reduced by introducing hierarchies and/or suppressing entries. For example, different field values may be combined into buckets and aggregated counts may be determined for the buckets.

Figure 5:
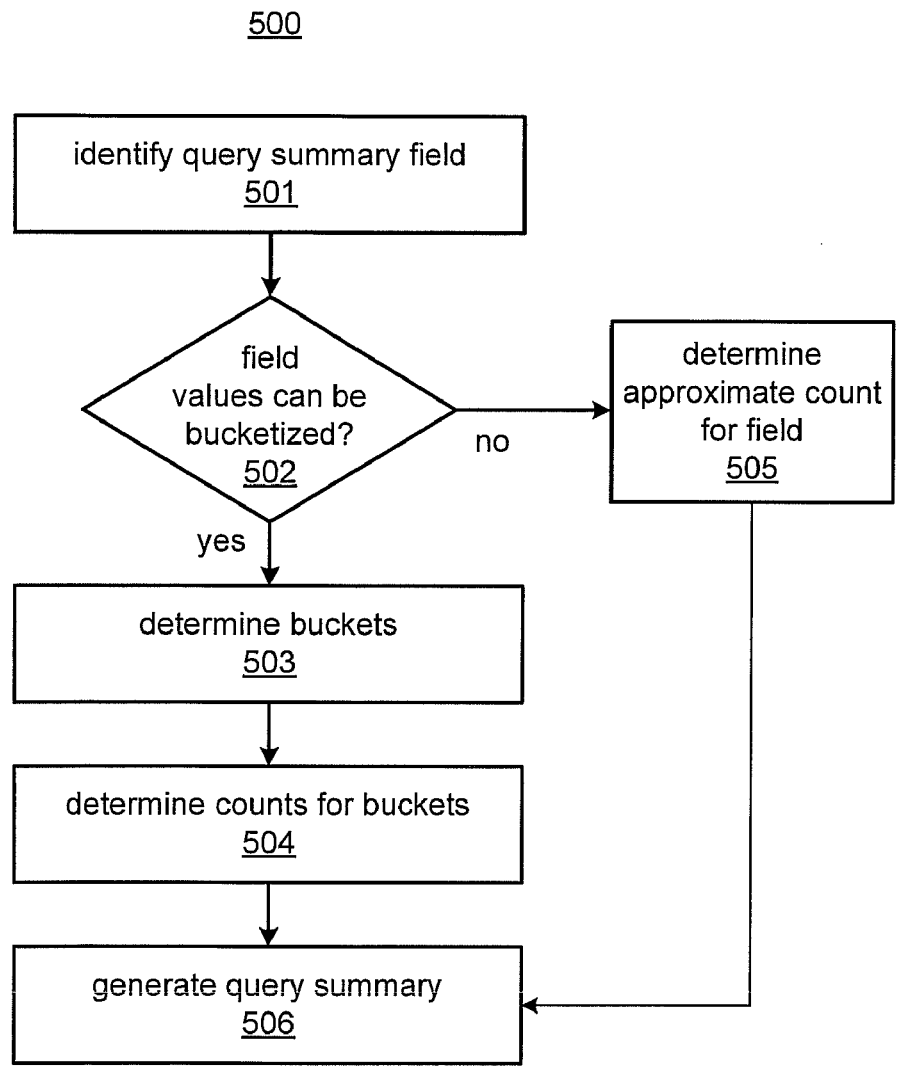

FIG. 5 illustrates a method 500 for reducing field cardinality. At 501, the control system 270 identifies a field. The field, for example, is a query summary field. At 502, the control system 270 determines if values for the field can be aggregated into buckets (i.e., bucketized). For example, numeric values can be bucketized but free text fields may not be bucketized. If field values can be aggregated into categories then the values can be bucketized.

At 503, if the field values can be bucketized, the control system 270 determines buckets for the field values. For example, buckets for numeric field values may be 10s, 100s, 1000s, etc. For example, there are 1 million values for the number of bytes field in a 100 million events. The control system 270 may first try to create buckets in 10s, such as 0, 10, 20, 30, etc. Each field value is put into a bucket. For example, 0-9 bytes are put into the 0 bucket, 10-19 bytes are put into the 10 bucket and so on. If there are too many buckets, which may be determined by comparing to a predetermined maximum number of buckets threshold, then the bucket size may be increased to 100s, then 1000s, etc. The bucket threshold may be determined based on memory size and/or a maximum number of values that can be shown in a single display. Similarly date and time fields and address fields are bucketized. For example, for addresses, the control system 270 may keep increasing a subnet mask to create buckets.

In some instances, if field values are put in uniform buckets then the buckets become skewed. To minimize skew, a log scale is created and the control system 270 keeps increasing the base of the log and put events in those buckets.

At 504, counts are determined for the buckets. The count may be the number of values in a bucket. Each bucket count is considered an aggregate count.

At 505, if the field values cannot be bucketized, an approximate count is determined for the field. For example, name of an event is a free text field and strings in this field cannot be aggregated. For example, even if few characters are the same, the names still cannot bucketized because they may not be related.

The control system 270 may keep an approximate count for a predetermined number of entries, e.g., 1000 entries, instead of keeping exact counts. For example, 1000 different field values for a field are kept in sorted order, such as from maximum value to least value. An event matching a query may include a new field value in the field that is not in the 1000 sorted field values. Assuming this new field value is not in the histogram of 1000 field values, the field value with the least number of entries (e.g., smallest count) is discarded from the histogram, and the new field value is added to the histogram. If the new field value was not previously discarded, then the count for the new field value is 1. However, if the field value was previously discarded, then the count of the new field value is set at the count of the discarded value plus 1. To determine if a field value was previously discarded, a bloom filter for each field value may be kept. The bloom filter stores a small amount of data that is used to determine if a field value was previously received. Using this data, the bloom filter can indicate with a fairly high degree of certainty whether the field value was previously received and discarded.

At 506, the query engine 272 generates the query summary with the counts for each bucket or the approximate count for the field. The method 500 may be repeated for each query summary field.

It may not be possible to show all the query summary fields without cluttering the user's view. To make good use of the on-screen space, the query summary fields may be prioritized according to the information the fields provide. The priorities may determine what query summary fields are shown first.

Figure 6:
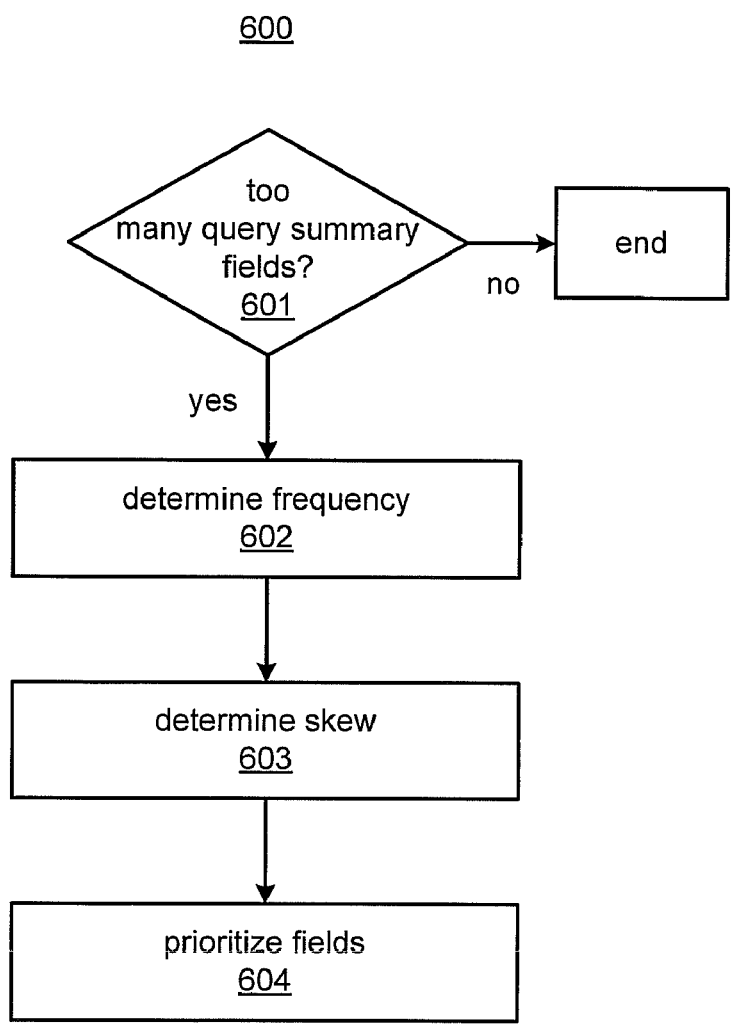

FIG. 6 illustrates a method 600 for determining how to prioritize query summary fields. At 601, the control system 270 determines if there are too many query summary fields to show to the user. A threshold number of maximum fields may be predetermined. If the threshold is exceeded, then there are too many fields. If yes, at 602, the control system 270 determines how frequently each field is in the query results. At 603, the control system 270 determines how skewed each field is. Skew is measured by entropy according to information theory. Entropy is a measure of the uncertainty associated with a random variable. An example of an entropy calculation is now described. The entropy H of a discrete random variable X with possible values $\{x_1, \ldots, x_n\}$ may be denoted as $H(X)=E(I(X))$. Here E is the expected value, and I is the information content of X. $I(X)$ is itself a random variable. If p denotes the probability mass function of X then the entropy can explicitly be written as $H(X)=\Sigma_{i=1}^{n} p(x_i) I(x_i)$. At 604, the fields are prioritized according to frequency and skew (e.g., measured entropy). For example, if a source device is sending 90% of data, the source device field is high priority and shown in a first screen.

The control system 270 may generate tuples for related fields. For example, if a source device X generates 50% of events in the query results and a target device Y is in 50% of the events in the query results, a tuple is generated to show the relationship between the fields because a large fraction of the events contain source device X and target device Y. The tuple may include source device X=35%, target device Y=30%, for example, because 35% of the events containing source device X also include target device Y and because 30% of the fields containing target device Y also include source device X. The most frequent tuples are shown to the user, either in a table or a tree-based format via a user interface. The number of events containing each tuple and their subset is shown to the user. This way of showing the tuples instead of single field values, allows the user to identify correlations between different fields in the events.

Figure 7:
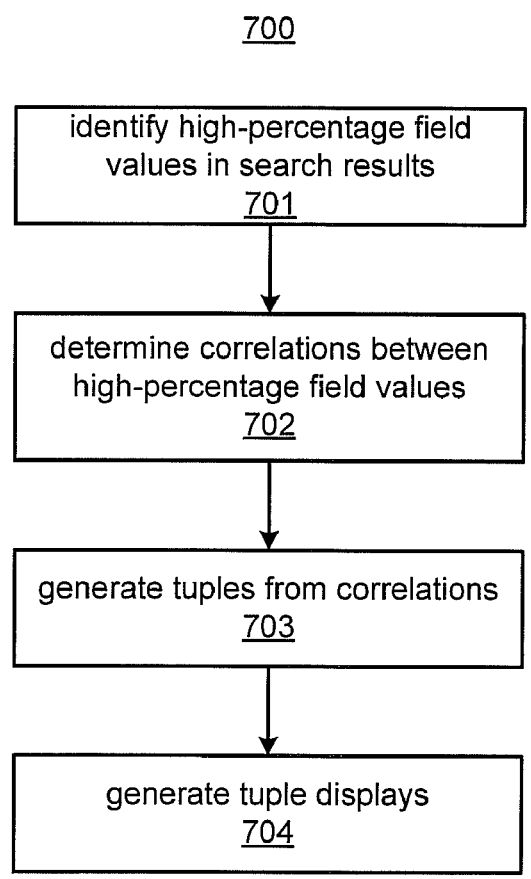

FIG. 7 illustrates a method 700 for generating tuples. At 701, the control system 270 identifies high-percentage field values in the search results. For example, the control system 270 identifies that the source device field has a field value, e.g., source device=X, that is in more than 49% of events in the query results, and that the target device field has a field value, e.g., target device=Y, that is in more than 49% of events in the query results. A threshold percentage may be used to identify these high-percentage field values. At 702, the control system 270 determines correlations between the high-percentage field values. The correlations may include indications that that the high-percentage field values are in the same events and metrics indicating the amount of time the high-percentage field values are in the same field events. At 703, the control system 270 generates tuples from the correlations. For example, a tuple may include (source device X=35%, target device Y=30%). The tuples are multidimensional because they contain field values for multiple fields. At 704, the control system generates tuple displays. A tuple display may include a list of the tuples. A tuple display may include tuple trees. For example, high-percentage field values in tuples are shown individually. A user may drill down on a high-percentage field value to display a list of tuples for the high-percentage field value in a tree format. The tuples in the tree may also be displayed in a table format.

Figure 8:
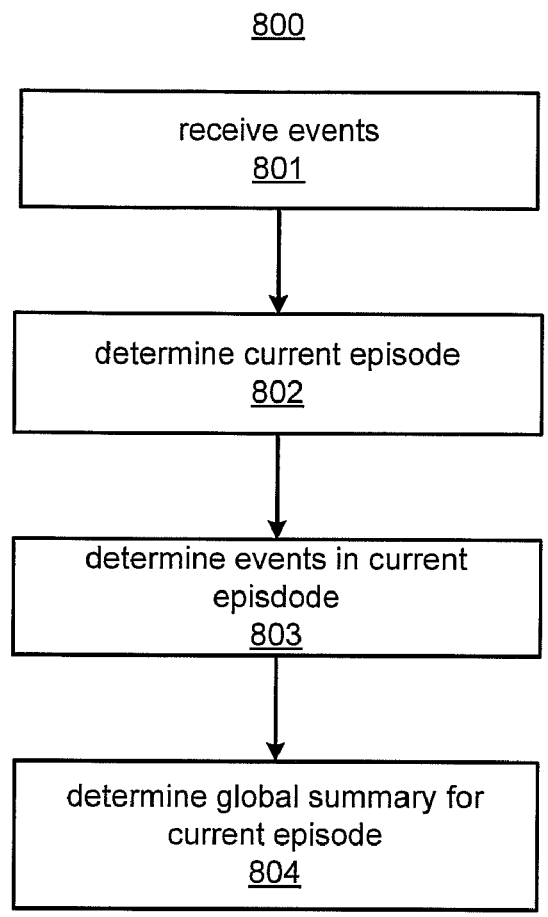

The control system 270 determines global summaries for predetermined time periods, referred to as episodes. FIG. 8 shows a method 800 for determining global summaries. At 801, events are received at the data storage system 122. At 802, the control system 270 determines a current episode and events in the episode are identified at 803. For example, for each 5-minute episode, a global summary is determined for the events in the episode. The ET or MRT of an event may be used to determine if an event is in a particular episode. At 804, a global summary is determined for the events in the current episode. The method 800 is repeated for the next 5-minute episode and so on. Thus, global summaries are continually determined through time for each episode and stored in the data storage system 122. Meta data indicates the time period for the episode. The global summary may include a summary for all the fields in the event schema or a subset of the fields.

Also, the episodic global summaries can be used to optimize a query executed for a large time range. For example, the global summaries can be used to quickly determine a narrow time range that has hits for the query rather than searching the entire time range.

FIG. 9 shows a computer system 900 that may be used with the embodiments described herein. The computer system 900 represents a generic platform that includes hardware components that may be in a server or another computer system. The computer system 900 may be used as a platform for the data storage system 122. The computer system 900 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 includes a processor 902 that may implement or execute machine readable instructions performing some or all of the methods, functions and other processes described herein. Commands and data from the processor 902 are communicated over a communication bus 909. The computer system 900 also includes a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums.

The computer system 900 may include an I/O device 910, such as a keyboard, a mouse, a display, etc. The computer system 900 may include a network interface 912 for connecting to a network. Other known electronic components may be added or substituted in the computer system 900. Also, the data storage system 122 may be implemented in a distributed computing environment, such as a cloud system.

While the embodiments have been described with reference to examples, various modifications to the described embodiments may be made without departing from the scope of the claimed embodiments.

What is claimed is:

1. A method of generating a query summary from data stored in a column store and a row store in a data storage system, the method comprising:
    receiving a query;
    determining query summary fields comprised of a subset of fields from a schema used to store data in the row store;
    determining if all the query summary fields are stored in the column store;
    if all the query summary fields are stored in the column store, searching the column store for query results in the query summary fields;
    if one of the query summary fields is not stored in the column store, searching the row store instead of the column store for the query results in the query summary fields;
    generating, by a processor, a query summary from the query results in the query summary fields;
    receiving a drill down request pertaining to the query summary, the drill down request identifying a query summary field;
    determining that the query summary field is not a field of the schema used to store data in the row store;
    in response to determining that the query summary field is not a field of the schema, creating a discovered field and adding the discovered field to the row store; and
    searching the row store using tokens associated with the discovered field to retrieve events matching the query for the query summary field, to satisfy the drill down request.

2. The method of claim 1, wherein generating a query summary from the query results in the query summary fields comprises:
    determining counts of field values in each of the query summary fields; and
    providing the counts in the query summary.

3. The method of claim 1, wherein generating a query summary from the query results in the query summary fields comprises:
    bucketizing, by the processor, field values for a query summary field into buckets;
    determining aggregated counts of the field values in the buckets; and
    providing the aggregated counts in the query summary.

4. The method of claim 1, wherein bucketizing field values for a query summary field into buckets comprises determining buckets by increasing a log scale if uniform buckets are scored.

5. The method of claim 1, wherein generating a query summary from the query results in the query summary fields comprises:
    determining an approximate count of field values in a query summary field, wherein determining an approximate count comprises:
        determining a predetermined number of field values for the query summary field;
        receiving a field value not in the predetermined number of field values;
        determining using a bloom filter for the query summary field, whether the received field value is a field value that was received previously;
        if the field value is determined to have been received previously, identifying a field value from the predetermined number of field values having a lowest count, discarding the field value having the lowest count, including the received field value in the predetermined number of field values, and assigning a count to the received value equal to the lowest count plus one; and
        if the field value is determined to not have been received previously, identifying a field value from the predetermined number of field values having a lowest count, discarding the field value having a lowest count, including the received field value in the predetermined number of field values, and assigning a count to the received value equal to one.

6. The method of claim 1, wherein determining the query summary fields comprises:
    prioritizing the query summary fields based on skew and frequency of hits in the query summary fields; and
    generating the query summary according to the priorities of the query summary fields.

7. The method of claim 1, comprising:
    identifying specific field values in the query results that are the query results more than a predetermined number of times;
    determining correlations between the specific field values;
    generating tuples of the specific field values based on the correlations; and
    generating a tuple display for the tuples, the tuple display comprising a list of the tuples, a tree-based display for each tuple, or a table display of tuples in each tree.

8. The method of claim 1, comprising:
    generating episodic global summaries;
    using the episodic global summaries to optimize the query if the query is time-based.

9. A non-transitory computer readable medium including machine readable instructions that when executed by a processor perform a method of generating a query summary from data stored in a column store and a row store in a data storage system, the instructions comprising instructions to:
    receive a query;
    determine query summary fields comprised of a subset of fields from a schema used to store data in the row store;
    determine if all the query summary fields are stored in the column store;
    if all the query summary fields are stored in the column store, search the column store for query results in the query summary fields;
    if one of the query summary fields is not stored in the column store, search the row store instead of the column store for the query results in the query summary fields;
    generate a query summary from the query results in the query summary fields;

receive a drill down request pertaining to the query summary, the drill down request identifying a query summary field;

determine that the query summary field is not a field of the schema used to store data in the row store;

in response to determining that the query summary field is not a field of the schema, create a discovered field and adding the discovered field to the row store; and search the row store using tokens associated with the discovered field to retrieve events matching the query for the query summary field, to satisfy the drill down request.

10. The non-transitory computer readable medium of claim 9, wherein instructions to generate a query summary from the query results in the query summary fields comprise instructions to:

determine counts of field values in each of the query summary fields; and provide the counts in the query summary.

11. The non-transitory computer readable medium of claim 9, wherein instructions to generate a query summary from the query results in the query summary fields comprise instructions to:

bucketize field values for a query summary field into buckets;

determine aggregated counts of the field values in the buckets; and provide the aggregated counts in the query summary.

12. The non-transitory computer readable medium of claim 9, wherein instructions to bucketize field values for a query summary field into buckets comprise instructions to determine buckets by increasing a log scale if uniform buckets are scored.

13. The non-transitory computer readable medium of claim 9, wherein instructions to generate a query summary from the query results in the query summary fields comprise instructions to:

determine an approximate count of field values in a query summary field, wherein determining an approximate count comprises:

determining a predetermined number of field values for the query summary field;

receiving a field value not in the predetermined number of field values;

determining using a bloom filter for the query summary field, whether the received field value is a field value that was received previously;

if the field value is determined to have been received previously, identifying a field value from the predetermined number of field values having a lowest count, discarding the field value having the lowest count, including the received field value in the predetermined number of field values, and assigning a count to the received value equal to the lowest count plus one; and if the field value is determined to not have been received previously, identifying a field value from the predetermined number of field values having a lowest count, discarding the field value having a lowest count, including the received field value in the predetermined number of field values, and assigning a count to the received value equal to one.

14. A data storage system comprising:

a processor to receive a query;

determine query summary fields comprised of a subset of fields from a schema used to store data in the row store;

determine if all the query summary fields are stored in the column store;

if all the query summary fields are stored in the column store, search the column store for query results in the query summary fields;

if one of the query summary fields is not stored in the column store, search the row store instead of the column store for the query results in the query summary fields;

generate a query summary from the query results in the query summary fields;

receive a drill down request pertaining to the query summary, the drill down request identifying a query summary field;

determine that the query summary field is not a field of the schema used to store data in the row store;

in response to determining that the query summary field is not a field of the schema, create a discovered field and adding the discovered field to the row store; and search the row store using tokens associated with the discovered field to retrieve events matching the query for the query summary field, to satisfy the drill down request; and a memory to store the query summary.

* * * * *